(12) United States Patent
Cazals et al.

(10) Patent No.: US 8,292,225 B2
(45) Date of Patent: Oct. 23, 2012

(54) AIRPLANE WITH FLAT REAR FUSELAGE SAID QUEUE-DE-MORUE EMPENNAGE

(75) Inventors: Olivier Cazals, Daux (FR); Jaime Genty de la Sagne, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 315 days.

(21) Appl. No.: 12/579,054

(22) Filed: Oct. 14, 2009

(65) Prior Publication Data
US 2010/0133377 A1 Jun. 3, 2010

(30) Foreign Application Priority Data
Oct. 17, 2008 (FR) .................................. 08 57092

(51) Int. Cl.
*B64C 1/00* (2006.01)
(52) U.S. Cl. .............................. 244/119; 244/87; 244/89
(58) Field of Classification Search .................. 244/119, 244/87, 89
See application file for complete search history.

(56) References Cited

U.S. PATENT DOCUMENTS

| 2,433,649 | A | * | 12/1947 | Clevenger et al. ......... 244/99.12 |
| D198,610 | S | * | 7/1964 | Burnelli ....................... D12/335 |
| 3,559,923 | A | * | 2/1971 | Moore ...................... 244/17.11 |
| 3,586,266 | A | * | 6/1971 | Bucher .......................... 244/36 |
| 3,869,102 | A | * | 3/1975 | Carroll ............................ 244/36 |
| 3,993,268 | A | * | 11/1976 | Moore .............................. 244/5 |
| 4,790,494 | A | | 12/1988 | Kohn |
| 6,098,922 | A | * | 8/2000 | Hahl ............................... 244/36 |
| 6,834,832 | B2 | * | 12/2004 | Jamgarov ................... 244/117 R |
| 2003/0213870 | A1 | * | 11/2003 | Eakins et al. ................. 244/119 |
| 2007/0023571 | A1 | * | 2/2007 | Kawai et al. ................. 244/119 |
| 2008/0142641 | A1 | * | 6/2008 | Moore et al. ................. 244/215 |
| 2010/0012773 | A1 | * | 1/2010 | Im ................................. 244/36 |
| 2010/0163669 | A1 | * | 7/2010 | Im ................................. 244/36 |
| 2011/0220758 | A1 | * | 9/2011 | Cazals et al. .................. 244/55 |

FOREIGN PATENT DOCUMENTS

| DE | 29806346 U1 | 7/1999 |
| EP | 1332961 A1 | 8/2003 |
| EP | 1616786 A1 | 1/2006 |
| EP | 1829782 A2 | 9/2007 |

OTHER PUBLICATIONS

French Search Report dated Jun. 4, 2009.

* cited by examiner

*Primary Examiner* — Christopher P Ellis
(74) *Attorney, Agent, or Firm* — Perman & Green, LLP

(57) ABSTRACT

An airplane includes a fuselage having a shape elongated along a longitudinal axis X of the airplane and at least one wing fixed to the fuselage between the front end and the rear end of the fuselage. The fuselage includes a substantially cylindrical central part and a rear tapered part on which a vertical empennage is fixed. Between a section connecting the rear part with the central part of the fuselage and the rear end the maximum width of each section of the fuselage is constant or increasing rearwards up to a maximum width L of the fuselage, the height of each section of the fuselage is decreasing rearwards in the direction of the negative X, so that the rear end of the fuselage forms a trailing edge having a small thickness which is substantially horizontal in an airplane reference system and substantially rectilinear.

11 Claims, 6 Drawing Sheets

AIRPLANE WITH FLAT REAR FUSELAGE SAID QUEUE-DE-MORUE EMPENNAGE

CROSS-REFERENCE TO RELATED APPLICATIONS

This application claims priority to French Application No. 08 57092 filed on 17 Oct. 2008.

BACKGROUND

The disclosed embodiments belong to the field of airplanes and more particularly to airplanes having a fuselage on the rear part of which a tail assembly is fixed.

In a known and currently the most implemented architecture for the production of commercial transport airplanes, an airplane mainly includes a more or less elongated fuselage to which a wing is fixed in a median position along the length of the fuselage and on the rear part of which a tail assembly is fixed, with a horizontal stabiliser and a vertical empennage, including various aerodynamic surfaces to provide the aerodynamic stability of the airplane and the maneuverability thereof using control surfaces associated with the empennages.

FIG. 1 shows an exemplary rear part of a fuselage 2 carrying an assembly of empennages according to the prior art.

To prevent too important a base drag, the rear part of the fuselage is tapered and the section thereof progressively decreases in height and width from a current section of the fuselage corresponding to a rear part of the substantially cylindrical fuselage part towards a much smaller fuselage end section.

This rear part of the fuselage is often called a rear cone because of its general shape close to a truncated cone.

On the rear cone are fixed on the one hand an horizontal stabiliser 10 and on the other hand a vertical empennage or fin 11 composed of specialized aerodynamic surfaces which are fixed on the sides and on the top of the fuselage 2.

This type of empennages, which is well known to airplane designers, however, has at least two main drawbacks.

First, providing empennages in a location of the fuselage with reduced dimensions is structurally complex, considering the efforts to be taken up by the rear fuselage and as regards the installation of the systems, more particularly because of the generally mobile horizontal stabiliser.

Second, because of the reduction of the sections in the rear cone and the volumes occupied by the empennage systems, the pressurized cabin cannot be extended rearwards as far as would be desirable and the rear part of the cabin most often has a reduced width, limiting the possibilities of arrangement of this area of the cabin.

Then, the rear part of the fuselage and the empennages thereof are most often prejudicial as regards mass, wetted area and useful volume of the fuselage.

In an other architecture, the canard airplanes use a horizontal stabiliser no longer positioned at the rear of the fuselage, but on the contrary in the front part of the fuselage, in front of the wing.

This architecture is rarely implemented in comparison with the solution of rear stabilisers except for small airplanes or fighter airplanes for which the aerodynamic problems connected to the canard stabilisers are more easily solved than on commercial airplanes having larger dimensions and having a less controllable payload distribution.

Although in this case, front horizontal stabilisers are distant from and independent of the rear vertical end, it is always necessary to reduce the section of the rear part of the fuselage in a rear cone.

Besides, the installation of the horizontal stabiliser on the fuselage must be made in a pressurized area of the fuselage and is prejudicial for an area of the fuselage where the payload is.

SUMMARY

In order to reduce the prejudicial aerodynamic and mass charges of the prior art solutions, the aspects of the disclosed embodiments provides a new shape for the rear part of the fuselage.

The airplane according to the disclosed embodiments includes, in a way known per se, a fuselage having a shape elongated along a longitudinal axis X of the airplane positively oriented towards the front of the airplane and at least a wing fixed to the fuselage between the front end and the rear end of the fuselage, including itself a substantially cylindrical central part and a rear tapered part which a vertical empennage is fixed.

On the airplane of the disclosed embodiments, the rear part of the fuselage has a flat shape.

This flat shape is such that, between a section connecting the rear part with the central part of the fuselage and the rear end of the fuselage:

the maximum width of each section of the fuselage is constant or increasing rearwards in the direction of the negative X up to the maximum width L of the fuselage;

the height of each section of the fuselage is decreasing rearwards in the direction of negative X so that the rear end of the fuselage forms a trailing edge having a low thickness and substantially horizontal in the airplane reference system and substantially rectilinear through the width L.

The flat shape provides a stabilization surface around a pitch axis of the airplane which prevents to resort to a conventional horizontal stabiliser and, in order to provide command and control around the pitch axis, the rear part of the fuselage includes a fuselage control surface articulated on the fuselage around a substantially horizontal axis in the airplane reference system and the trailing edge of which corresponds to the end of the fuselage.

The trailing edge control surface is advantageously provided, on the trailing edge side thereof, with a secondary control surface articulated around an axis substantially horizontal in the airplane reference system and the reduced dimensions of which, with respect to those of the fuselage control surface, make it possible to perform a fine aerodynamic control or to modify the hinge moments of the fuselage control surface.

The arrangement of the elevator in the rear part of the fuselage makes it possible to have a useful volume greater than that available in the case of a conventional horizontal thin stabiliser profile for articulating the fuselage control surface at the level of a rear frame of the fuselage and provides the motions of the control surface through an actuator integral with the frame positioned in front of the rear frame.

For the stability and control around the vertical axis, the yaw axis, the airplane includes a vertical empennage fixed to the fuselage on the rear part of the fuselage which has a high cross sectional rigidity due to its flat shape.

According to the stability and control requirements and required empennage surfaces, the vertical empennage advantageously includes two fins fixed on edges of said rear part and, in a preferred embodiment, in order to enhance the aerodynamic performances of the fuselage control surface(s), each vertical fin includes, in the lower part thereof close to the fuselage, an internal wall on the side of the vertical plane of symmetry of the airplane which is substantially vertical in order to keep a space as reduced as possible between the fin and the concerned end of the elevator when the elevator is directed upwards.

In one embodiment, the fins are extended under the fuselage by ventral fins which also have, for the same reasons, substantially vertical walls on the side of the vertical plane of symmetry of the airplane.

Thanks to their aerodynamic surfaces, the ventral fins also enhance the stability around the yaw axis and if need be protect the rear fuselage and the fuselage control surface(s) against a contact with the ground upon the rotation of the airplane, more particularly upon taking off.

In a particular embodiment aiming at increasing the stability or control aerodynamic surface as regards pitch, both fins are inclined outwards so as to form a butterfly empennage structure, the fins of which are distant at the level of the links of said fins with the fuselage.

In another form aiming at obtaining an equivalent result without affecting the control capacity around the yaw axis, a substantially horizontal aerodynamic surface, which can include a trailing edge control surface, is fixed in an upper part of the fins, for example through curved shapes of the horizontal surface of interest, in order to form an annular empennage or through sharp edge junctions to form an H-shape empennage, in order to reinforce the effects of the flattened fuselage.

In another embodiment aiming at increasing the stabilization and control surface around the pitch axis, substantially horizontal aerodynamic surfaces arranged beyond the edges of fuselage which are close to the end of the fuselage and the trailing edges of which are substantially extending the trailing edge of the rear end of the fuselage.

In order to increase the capacity of the airplane as regards control around the pitch axis, each side extension is articulated around the substantially horizontal axis in the airplane reference system or includes a trailing edge control surface articulated on a fixed part of said side extension about an axis substantially parallel to the trailing edge.

In one embodiment, the airplane includes at least one engine fixed to the fuselage above the rear part of the fuselage, which is an advantageous position more particularly as regards acoustics.

BRIEF DESCRIPTION OF THE DRAWINGS

The detailed description of exemplary embodiments of the invention is made while referring to the Figures which schematically show.

DETAILED DESCRIPTION

Figure 3:
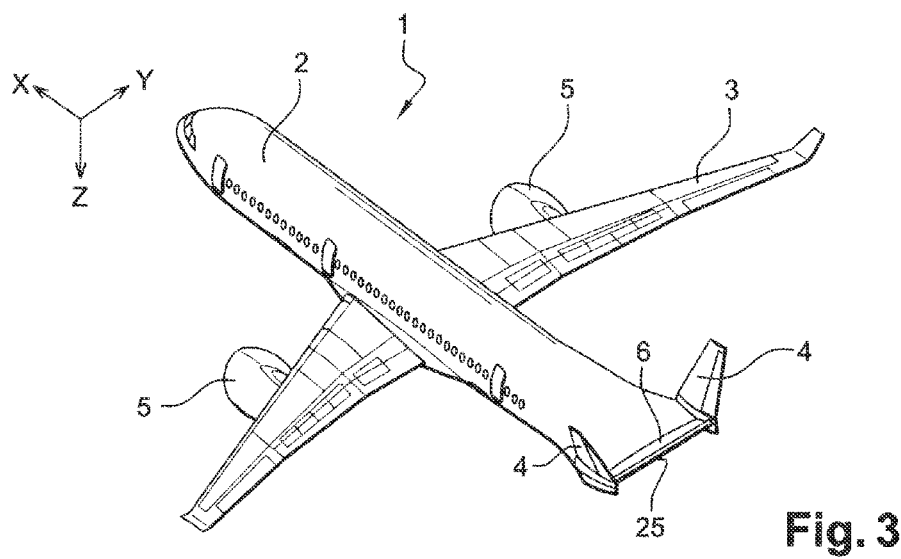
FIG. 3: a perspective global view of an exemplary airplane according to the invention.
Figure 4A:
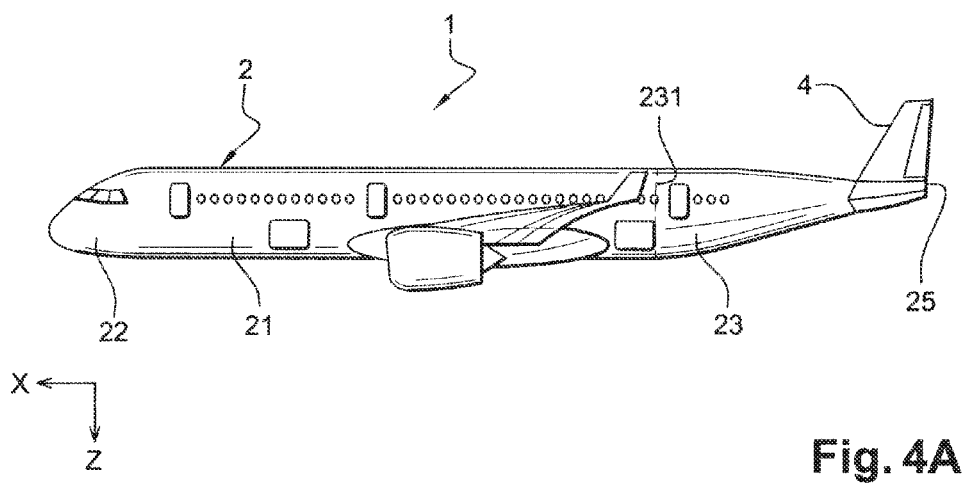
FIGS. 4a to 4d: lateral views (FIG. 4a), top view (FIG. 4b), front view (FIG. 4c) and rear view (FIG. 4d) of the airplane of the FIG. 3.
Figure 4B:
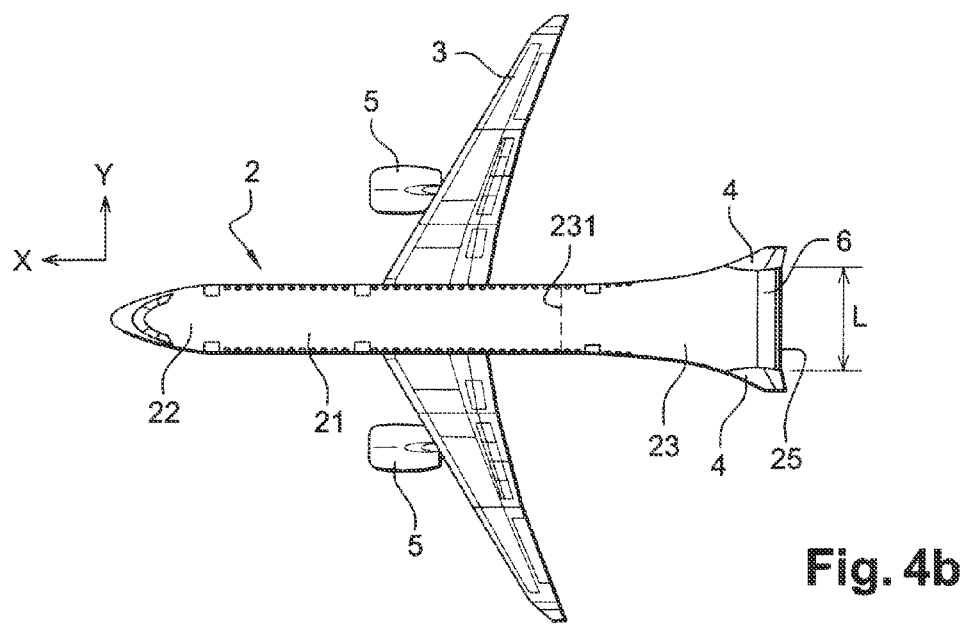
Figure 4C:
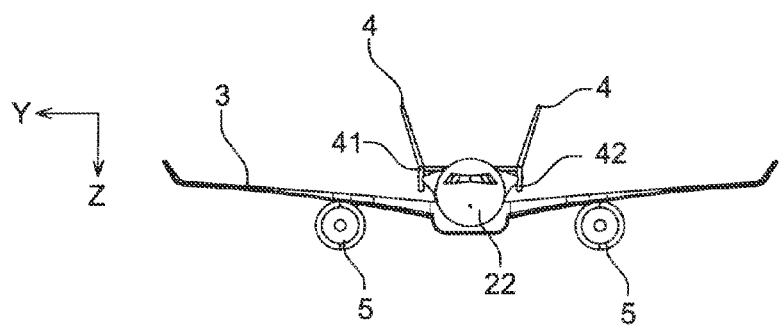
Figure 4D:
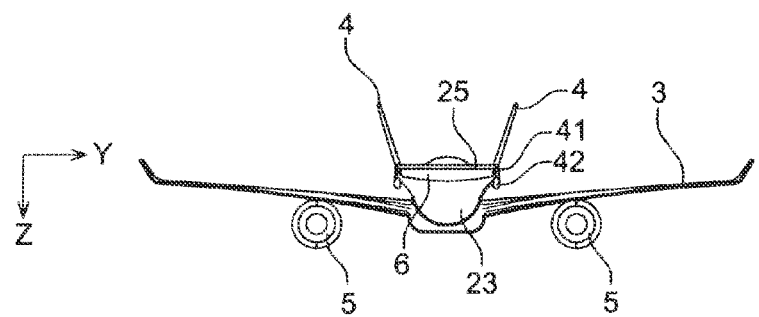

As illustrated as a non limitative example in FIG. 3 in perspective and in FIGS. 4a to 4d according to various projection views, an airplane 1 according to one embodiment includes an extended fuselage 2, a wing 3 fixed to the fuselage and a vertical empennage 4 fixed to the fuselage on a part of the fuselage 2 which is substantially positioned behind the wing 3.

As per the conventions used in the field of airplane designs, the airplane 1 is, as requested by the description associated with an airplane reference system defined by:

an axis X corresponding to a longitudinal axis of the airplane 1 and the fuselage 2, positively oriented towards the front of the airplane in the flight direction;

an axis Z corresponding to a vertical axis of the airplane 1, i.e. an axis perpendicular to axis X in a vertical plane of symmetry XZ of the airplane and positively oriented towards the bottom of the airplane;

an axis Y perpendicular to the vertical plane of symmetry XZ and forming the direct air-path axis system with the axes X and Z, which means that Y is positively oriented towards the right of the airplane 1.

The extended fuselage 2 includes the substantially cylindrical central part 21, for example having a circular cross-section or a multi-lobed section or an elliptical section, as well as in front of said central part a front tapered part 22 in which a cockpit is generally positioned, and at the back a rear tapered part 23 on which the vertical empennage 4 is fixed.

The wing 3 is fixed to the fuselage 2 at a lower part of the fuselage on the side of the positive Zs, as is illustrated, or is fixed at an upper part of the side of the negative Zs or at an upper part in an intermediary high position, solutions which are not illustrated.

In a way known per se, propulsion engines 5, for example jet engines, are fixed on the wing.

The rear tapered part 23 of the fuselage 2 corresponds to a shape progressively flattening rearwards, the height of which along direction Z continuously decreases from a front section 231 for connection to the central part 21 up to a rear end 25 of the fuselage at the level of which height is substantially null, in practice the thickness of an aerodynamic control surface trailing edge, as will be understood when reading the following description, which is low as compared to the other characteristic dimensions of the control surface.

In addition, contrary to the height according to direction Z, the width according to direction Y of the rear tapered part 23 remains at least equal to a maximum width of the fuselage in the central part 21 and continuously increases from the front section 231 for the connection up to the rear end 25.

The expression "continuously increases" must be considered here in a general meaning, which means that said maximum width locally increases or remains constant. More particularly, the shape of the rear part is such that the maximum width of the fuselage in this part can be kept constant on a more or less important distance along X.

In the example illustrated in the FIGS. 3, 4b, 4c and 4d, the width of the rear part 23 is substantially constant, on the one hand in the front area of said rear part behind the front section 231 for the connection, and on the other hand in a rear area of said rear part close to the end 25.

The precise definition of the shapes as seen from above of the rear part 23 of the fuselage depends both on aerodynamic constraints and airplane arrangement constraints, and is within the capacity of the persons skilled in the art so long as the principles of the airplane according to the invention are applied.

Close to the rear end 25 of the fuselage 2, i.e. in an area ending with a substantially null height, the fuselage thus has a width L at least equal to and preferably greater than the maximum width of the fuselage 2 of the airplane 1 in the central part, thus giving it a so-called flat tail.

Said rear end forms a substantially rectilinear trailing edge of the rear part 23 of the fuselage.

Advantageously, an aerodynamic control surface 6, also called a fuselage control surface, is arranged in such rear part of the fuselage 2 at the level of the trailing edge at the rear end 25.

In the illustrated example, the vertical empennage 4 includes two substantially vertical fins fixed to the fuselage at either side and located close to the rear end 25.

In a way known per se, the fins are provided with trailing edge control surfaces to provide the control of the airplane around the so called yaw axis Z.

The so-called yaw axis control surfaces are limited, as regards their extensions in lower parts, on the fuselage 2 side so that interferences between the fuselage control surface 2 and said yaw control surfaces are avoided when control surfaces are deflected.

Figure 1:
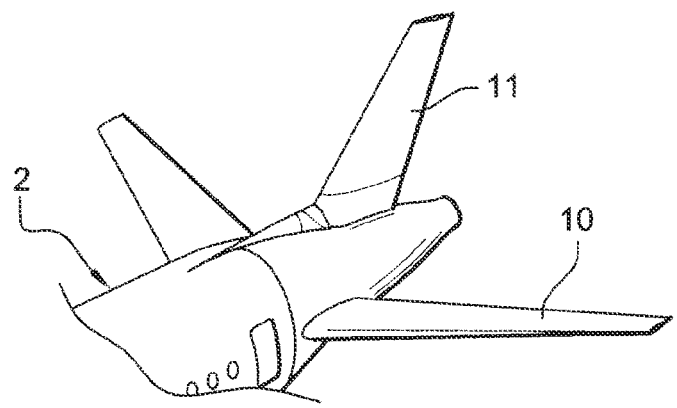
FIG. 1: as already mentioned, a perspective view of a rear fuselage of a known airplane with conventional empennages.
Figure 2A:
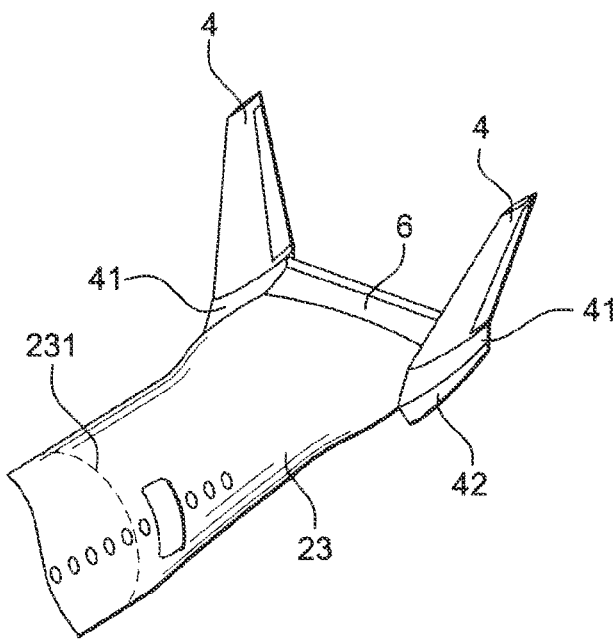
FIGS. 2a and 2b: perspective views of a rear fuselage of an exemplary airplane according to the invention.
Figure 2B:
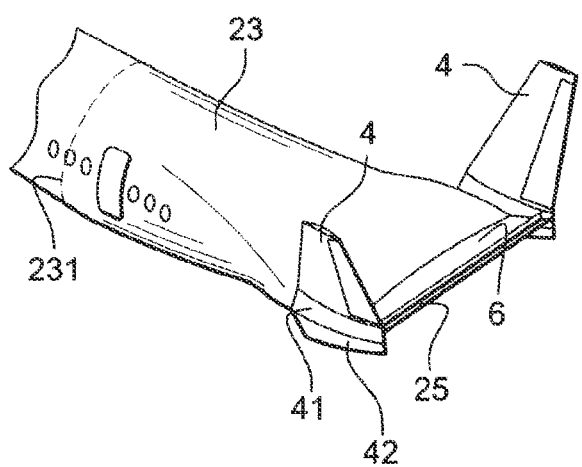

Such characteristics of the rear part 23 of the fuselage appear more clearly on the details of the FIGS. 2a and 2b which are shown in perspective views.

Figure 5:
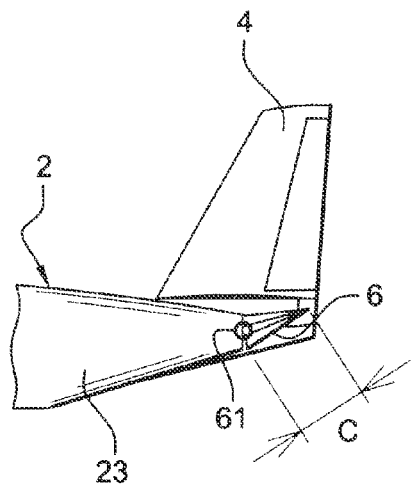
FIG. 5: a side view of the rear end of the fuselage without the fin on the side observed.

As illustrated in FIG. 5, which shows the rear part 23 of the fuselage as seen from the side, with the fin in the foreground not being shown, the fuselage control surface 6 is articulated on the structure of the fuselage 2, so that it can be deflected upwards or downwards by pivoting around an axis 61 which is substantially parallel to the Y-axis.

Due to its rear position and to the direction of its displacements, the fuselage control surface 6 is thus a control surface for controlling the motions of the airplane around the pitch axis Y, i.e. an elevator, like a conventional horizontal stabiliser control surface.

Thanks to its flat shape, the rear fuselage 23 is a pitch-stabilising surface and participates in the efficiency of the fuselage control surface 6 in the extension thereof which is operated as an element of the rear curvature of said fuselage stabilising surface.

A particular characteristic of the fuselage control surface 6 results, on the one hand, from the relative thickness thereof at the level of the connection thereof with the fuselage 2, which is advantageously more important than that of a conventional horizontal stabiliser control surface, because of the tapering of the rear fuselage as compared to a thin aerodynamic profile of a conventional horizontal stabiliser and, on the other hand, the possibility for the airplane designer to define the chord C, i.e. the length along direction X, of said fuselage control surface.

The thickness of the control surface 6 is advantageously used for making simpler and lighter structures and the possibility of defining the length of the chord C with a relative flexibility makes it possible to make the fuselage control surface 6 with the required efficiency, considering the requirements as regards the stability and the maneuverability of the airplane.

Figure 6:
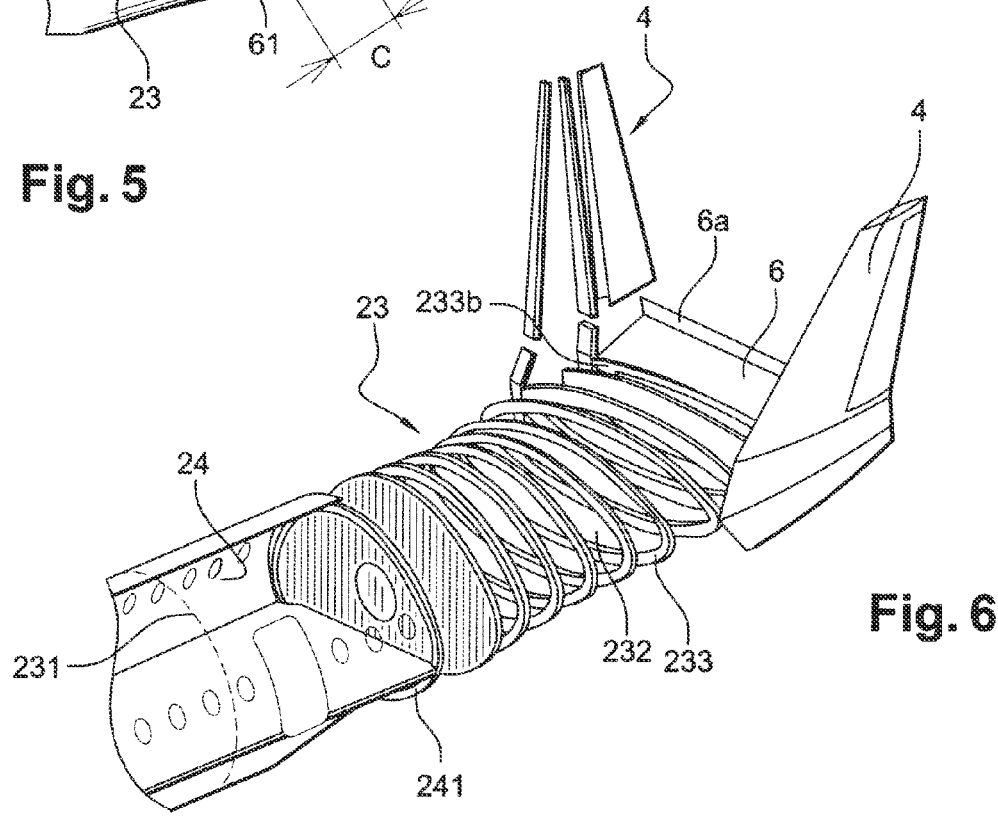
FIG. 6: an exploded view of the rear part of the airplane of FIG. 3.

In FIG. 6, the rear part 23 of the fuselage is shown in an exploded view.

The rear part 23 of the fuselage includes, in the illustrated arrangement, a front area corresponding to a rear part of a pressurised cabin 24 in the airplane, with said rear part ending in a rear bulkhead 241.

At the position along the longitudinal direction X along the fuselage of the rear bulkhead 241, the shape of the fuselage evolves with respect to the substantially constant section of the central part of the fuselage which can be seen by a reduced height in the section of the fuselage considered.

Behind the rear bulkhead 241, the rear part 23 of the fuselage includes a non-pressurised area 232 of which only structural frames 233 are schematically shown, the shapes of which evolve from the shape of the rear bulkhead 241 to more and more flattened shapes, i.e. a reduction in the height of the section the further rearwards the considered face is located, i.e. the negative X.

In addition, the frames 233 have a width which increases or at least remains locally substantially constant the further rearwards the face considered is located, up to a last fixed frame 233b, the so-called rear frame, on which the fuselage control surface 6 is articulated.

The progressive though sufficiently quick flattening to regularly evolve to a low thickness of the rear end 25 of the structure of the fuselage in the non-pressurised area 232, does not entail any particular problem which could be connected to the pressurisation and however offers relatively important volumes for the installation of systems (not shown) of the airplane 1, more particularly because there is no conventional horizontal stabiliser through structure.

Figure 7:
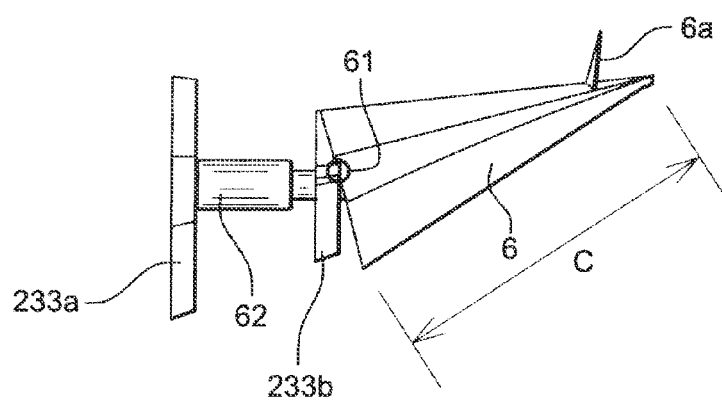
FIG. 7: a detailed extract of the fuselage control surface.

FIG. 7 schematically illustrates the detail of the last frames of the structure in the rear part 23 and the control surface 6.

The control surface 6 is articulated around the axis 61 on the rear face 233b and an actuator 62 which is integral with the control surface—here a linear actuator taken up at the end opposite the control surface on a frame 233a in front of the rear frame 233b, makes it possible to modify the angular position of the control surface around the axis 61.

In one embodiment, the fuselage control surface 6 includes, at the trailing edge thereof, a secondary control surface 6a having reduced dimensions, more particularly chord dimensions.

Like the fuselage control surface 6, the secondary control surface 6a is movable in rotation around an axis parallel to axis Y.

In one embodiment, illustrated in FIG. 7, the secondary control surface 6a is an upper surface control surface positioned at the top of the fuselage control surface 6 and which is essentially movable on the side of the upper part of said fuselage control surface.

In another embodiment, not illustrated, the secondary control surface 6a extends the fuselage control surface 6 of which it forms the closest part to the trailing edge and is movable upwards and downwards of a medium plane of said fuselage control surface.

The secondary control surface according to various known embodiments is moved in rotation independently of the control surface 6, for example in a high speed control surface mode, or is moved according to the control surface 6 in a direction opposite that of said control surface 6, for example to reduce the hinge moment of the control surface 6, or is moved according to the control surface 6 and in the same direction as said control surface 6, for example to prevent a null or too low hinge moment of the fuselage control surface 6 or to increase the aerodynamic effect of the fuselage control surface 6.

Again in FIG. 6, the fins of the vertical empennage 4 are fixed on the sides of the fuselage in an area close to the fuselage edge close to the rear end 25.

In a preferred embodiment, as illustrated in the Figures, each side fin 4 includes, in the lower part thereof, close to and above the fuselage, a fin foot part 41 the walls of which, at least one wall of which on the side of the vertical plane of symmetry XZ, is substantially vertical so that, during the upward movements of the fuselage control surface 6 and possibly of the secondary control surface 6*a*, the gap between the control surface(s) and the fin remains as reduced as possible and possibly null when using sliding gaskets.

Similarly and searching for the same result when the control surface(s) is/are deflected downwards, each fin 4 is extended in a lower part under the fuselage by means of a ventral fin 42 substantially vertical, at least for a wall of the side of the vertical plane of symmetry XZ.

By avoiding the formation of a significant gap between the control surfaces and the side walls of the fins, the aerodynamic efficiency of the control surfaces is significantly improved because of the effect on the aerodynamic flow at the ends of the control surfaces with respect to the free ends.

The efforts on the fins are advantageously transmitted to the structure of the fuselage at the level of the strong frames 233.

Because of the width of the fuselage 2 in this area and on the side of the positive X in front of the fins, the fuselage has a global rigidity which prevents the fuselage from significantly deforming when the control surfaces exert lateral forces and thus avoids complex structural solutions and the aero-elastic coupling hazard in flight which limit the flight domain of the airplane or require specific solutions.

The arrangement of the fuselage of an airplane which has just been shown is thus particularly advantageous in several respects.

First, it prevents installing a conventional horizontal stabiliser added onto the fuselage which is relatively heavy and complex and leads to a horizontal stabiliser which is vulnerable in case of projections of a foreign matter in the upstream aerodynamic flow.

Second, it leads to a fuselage the aerodynamic performances and mass of which are optimized with respect to a fuselage ending with a tail cone:

in the absence of a horizontal stabiliser positioned at the rear lines of the fuselage, in its upper part are advantageously more flat which results in the improvement of the quality of the aerodynamic flow and reduction in the friction drag and form drag.

in the absence of the necessary disturbances of structure in the case of an added horizontal stabiliser and of an improved lateral rigidity, the structure mass of the rear part of the fuselage is advantageously reduced;

the presence of the fuselage control surface with a thin trailing edge limits the fuselage base drag;

the architecture makes it possible to have further raised fuselage shapes and in this case improves the ground clearance of the fuselage during the rotation upon taking off and makes it possible to reduce the height of the landing gear of the airplane 1.

Eliminating the conventional horizontal stabiliser, the functions of which are provided by the fuselage having the shape of the invention and the fuselage control surface makes it possible to reduce the mass of the rear structure of the fuselage incorporating the empennages, with respect to a conventional airplane as well as the wetted area of the same assembly.

Third, by avoiding the required reduction in the width of the fuselage in the case of a tail cone, the pressurized cabin in the airplane is extended to the back without a substantial reduction in the width of the cabin as compared to the conventional fuselage which is particularly advantageous in the cabin configuration for transporting passengers since the number of passengers in the same row remaining unchanged in the rear part of the cabin as it is in so-called cargo configurations, containers or pads having standardized width can be used in this case up to the rear bulkhead level 241.

In addition, the useful volume in the rear non pressurized area is improved and thus makes it possible to arrange a rear fuel tank having a capacity greater than that of a known horizontal stabiliser tank for an airplane of equivalent dimensions.

Fourth, the dimensions of the fuselage control surface are easily resizable during the design process as regards width and chord, so as to obtain the performances expected from the airplane as regards the pitch stability and longitudinal control quality, this without any prejudice to the mass of the structure of the rear part of the fuselage because of the relative important thickness of the control surface.

The invention is not limited to the detailed embodiments hereinunder and while remaining within the principles of the invention, can be applied to various alternative solutions among which some non limitative examples are given hereinunder and can also be considered as combined together and/or with the previous detailed description.

In a non illustrated alternative solution, the elevator is provided in two or several parts distributed according to the span of the rear end 25 of the fuselage, an arrangement which makes it possible to have the elevators members redundant.

According to another not shown alternative solution, the fins 4 are inclined with respect to the vertical, at least above a vertical part close to the fuselage in an intermediate position between the vertical plane of symmetry XZ and a horizontal XY for example between 30 and 45 degrees, substantially symmetrically with respect to the vertical plane of symmetry so as to form a butterfly empennage in which both aerodynamic plans are distant at the level of their bases fixed to the fuselage.

In this alternative solution, the fins provide, through vertical components of the aerodynamic forces on such fins a part of the functions of longitudinal stability and pitch control of the airplane through trailing edge control surfaces.

Figure 8A:
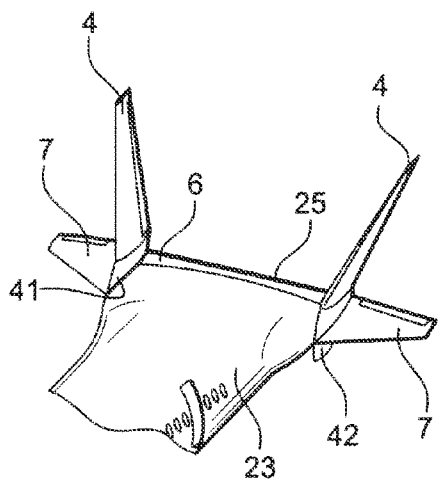
FIGS. 8a and 8b: perspective views of the rear parts of alternative solutions for the airplane according to the invention with lateral extensions.
Figure 8B:
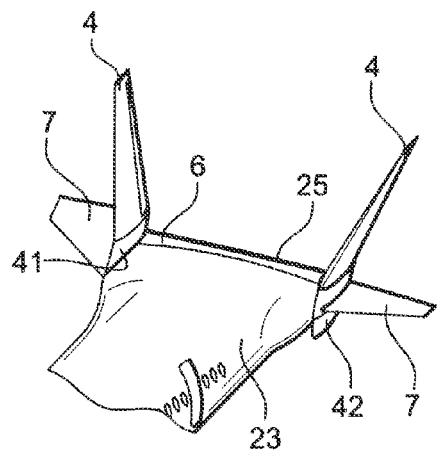

In another alternative solution, illustrated in FIGS. 8*a* and 8*b*, the side extensions 7 formed by substantially horizontal aerodynamic surfaces are arranged beyond the fuselage edges close to the end 25 of the fuselage. Such extensions 7, trailing edges of which are substantially extending the trailing edge of the fuselage control surface 6, result in the enhancement of the longitudinal behavior of the airplane without exaggeratingly widening the rear fuselage, if so required.

The extensions 7 are for example fixed surfaces (not shown solution), the role of which is then limited to increasing the longitudinal stability, or surfaces including a fixed part and a movable trailing edge control surface (as shown in FIG. 8*a*) or aerodynamic surfaces making all moving control surfaces (as shown in FIG. 8*b*).

Figure 9A:
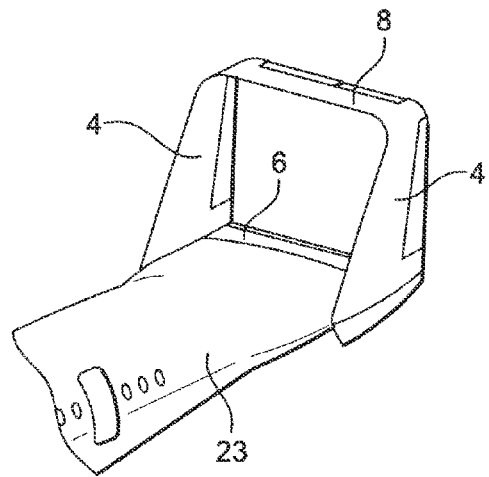
FIG. 9a: a perspective view of the rear part of an alternative solution of the airplane according to the invention with an annular empennage.
Figure 9B:
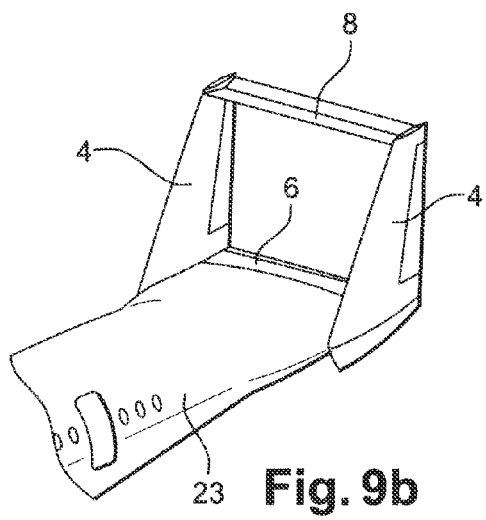
FIG. 9b: a perspective view of the rear part of an alternative solution of the airplane according to the invention with an H-shape empennage.

In other alternative solutions shown in FIGS. 9*a* and 9*b*, a horizontal additional surface 8 is arranged in the upper part of the fins of the vertical empennage in order to increase the longitudinal stability and pitch control capacity of the airplane.

The additional horizontal surface 8 is for example as in FIG. 9a connected by curved shapes at the ends of said additional surface, thus forming an annular empennage, the trailing edge control surfaces of the various parts of which jointly act to provide the control of the airplane.

The additional horizontal surface 8 can also, as shown in FIG. 9b, be provided in a more or less higher part on the fins 4 with sharp edge junctions to form a so-called H-shaped empennage structure.

Figure 10:
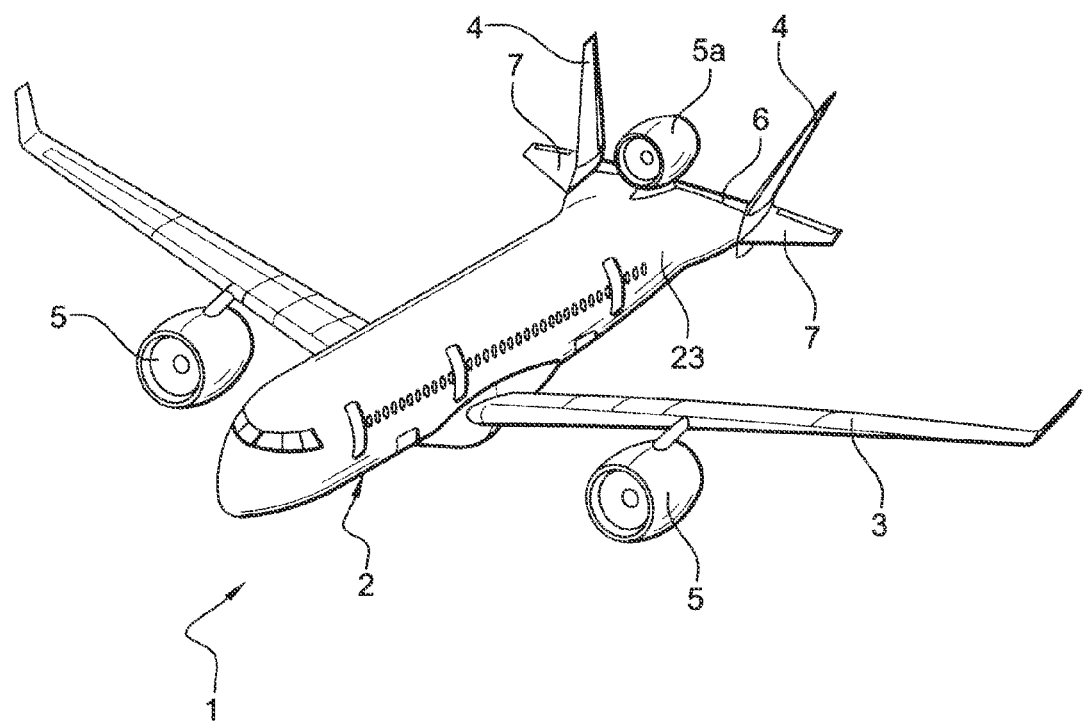
FIG. 10: a perspective view of the rear part of an alternative solution of the airplane according to the invention with a rear engine fixed on the fuselage.

In an example of an embodiment illustrated in FIG. 10, a fuselage engine 5a is arranged above the fuselage. According to this arrangement of the powerplant installation making it possible to reduce the power of the engines 5 fixed on the wing, the airplane fuselage 2 according to the invention is particularly advantageous as regards acoustic issues, since the flattened shape of the rear part 23 of the fuselage efficiently masks the noise radiated downwards by the air inlet and the nozzles fuselage engine 5a and the fins hide the noise radiated sideward by the nozzles.

Depending on the dimensions of the fuselage and those of the engines implemented, more than one engine for example two or three engines are provided on the rear fuselage together with motors fixed on the wing or not.

Thus, the invention makes it possible to build an airplane with a simplified and lighter rear structure of the fuselage thus improving the useful volume of the fuselage, with respect to the conventional fuselages.

The invention claimed is:

1. An airplane including a fuselage having a shape elongated along the longitudinal axis X of the airplane positively oriented towards the front of the airplane and including at least one wing fixed to the fuselage between a front end and a rear end of said fuselage, the fuselage including a substantially cylindrical central part and a rear tapered part on which a vertical empennage is fixed, wherein, between a section connecting the rear part with the central part of the fuselage and the rear end:
   a maximum width of each section of the fuselage is constant or increasing rearwards in the direction of the negative X up to a maximum width L of the fuselage;
   a height of each section of the fuselage is decreasing rearwards in the direction of the negative X, so that to have a shape progressively flattening rearwards and that the rear end of the fuselage forms a trailing edge having a small thickness which is substantially horizontal in an airplane reference system and substantially rectilinear through the width L.

2. An airplane according to claim 1, wherein the rear part of the fuselage includes a fuselage pit control surface articulated on the fuselage around an axis substantially horizontal in the airplane reference system and a trailing edge of which corresponds to the end of the fuselage.

3. An airplane according to claim 2, wherein the fuselage pitch control surface includes, on the trailing edge side, a secondary control surface articulated on said fuselage control surface around an axis substantially horizontal in the airplane reference system.

4. An airplane according to claim 3, wherein the fuselage pitch control surface is articulated on the fuselage at the level of a rear frame of the fuselage and moved by an actuator integral with a frame positioned in front of the rear frame.

5. An airplane according to claim 1 further comprising a vertical empennage fixed to the fuselage on the rear part of the fuselage, said vertical empennage including two fins fixed on edges of said rear part, said fins including, each in a lower part close to the fuselage, a substantially vertical wall on the side of the vertical plane of symmetry XZ.

6. An airplane according to claim 5, wherein each fin of the vertical empennage is extended in a lower part under the fuselage by a ventral fin a wall of which on the side of the vertical plane of symmetry XZ is substantially vertical.

7. An airplane according to claim 5, wherein the fins are inclined outwards, at least in a part above the lower parts of said fins, so as to form a butterfly tail structure, the fins of which are distant at the level of the links of said fins with the fuselage.

8. An airplane according to claim 5, wherein a substantially horizontal aerodynamic surface is fixed in an upper part of said fins, connected by curved shapes of the ends of said aerodynamic surface or through sharp edged junctions, said aerodynamic surface including one or several trailing edge control surface(s).

9. An airplane according to claim 1 further comprising side extensions composing substantially horizontal aerodynamic surfaces arranged beyond the fuselage edges close to the end of the fuselage and trailing edges of which are substantially extending the trailing edge of the rear end of the fuselage.

10. An airplane according to claim 9, wherein each side extension is articulated around a substantially horizontal axis in the airplane reference system or includes a trailing edge control surface articulated on the fixed part of said side extension around an axis substantially parallel to the trailing edge.

11. An airplane according to claim 1 further comprising at least one engine fixed to the fuselage above the rear part of the fuselage.

* * * * *